(12) United States Patent
Liu et al.

(10) Patent No.: US 6,339,734 B1
(45) Date of Patent: Jan. 15, 2002

(54) METHOD AND APPARATUS FOR REDUCING SPACECRAFT INSTRUMENT INDUCED JITTER VIA MULTIFREQUENCY CANCELLATION

(75) Inventors: Ketao Liu, Cerritos; David S. Uetrecht, Palos Verdes, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/510,136

(22) Filed: Feb. 22, 2000

(51) Int. Cl.$^7$ .............................. G06F 17/00; B64G 1/38
(52) U.S. Cl. .......................................... 701/13; 244/164
(58) Field of Search ............................ 701/13; 244/164, 244/170, 189, 171, 173

(56) References Cited

U.S. PATENT DOCUMENTS 5,025,381 A * 6/1991 Goodzeit et al. .............. 701/13
5,654,549 A * 8/1997 Landecker et al. .......... 250/332

FOREIGN PATENT DOCUMENTS

JP          6-72396     *  3/1994

OTHER PUBLICATIONS

Sen M. Kuo and Dennis R. Morgan, "Active Noise Control: A Tutorial Review", Jun. 1999, vol. 87 No. 6 Proceedings Of The IEEE, pp. 941–973.

Woodard et al.; Measured spacecraft dynamic effects on atmospheric science instruments; Geoscience and Remote Sensing, IEEE Trans,; Mar. 1998; vol. 36, iss. 2; pp. 359–367.*

* cited by examiner

Primary Examiner—Michael J. Zanelli
(74) Attorney, Agent, or Firm—Gates & Cooper LLP (57) ABSTRACT

A method, apparatus, article of manufacture, and a memory structure for compensating for instrument induced spacecraft jitter is disclosed. The apparatus comprises a spacecraft control processor for producing an actuator command signal, a signal generator, for producing a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and at least one spacecraft control actuator, communicatively coupled to the spacecraft control processor and the signal generator for inducing satellite motion according to the actuator command signal and the cancellation signal. The method comprises the steps of generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and providing the cancellation signal to a spacecraft control actuator. The apparatus comprises a storage device tangibly embodying the method steps described above.

29 Claims, 12 Drawing Sheets

METHOD AND APPARATUS FOR REDUCING SPACECRAFT INSTRUMENT INDUCED JITTER VIA MULTIFREQUENCY CANCELLATION

The invention described herein was made in the performance of work under NASA Contract Number NAS5-98069 and is subject to the provisions of Section 305 of the National Aeronautics and Space Act of 1958 (72 Stat. 435; 42U.S. C 2457).

BACKGROUND OF THE INVENTION

1. Field of the Invention

The present invention relates to systems and methods for controlling spacecraft, and in particular to a system and method for reducing instrument-induced spacecraft attitude jitter.

2. Description of the Related Art

Spacecraft jitter is a common problem experienced by fine-pointing Earth or space observation spacecraft. Spacecraft jitter may be caused by a number of factors, including the motion of instruments mounted in or on the spacecraft.

Conventional solutions to reduce spacecraft jitter fall into two categories. The first solution is to increase spacecraft attitude control system bandwidth. This provides tighter control over the spacecraft attitude, thus reducing the peak and average jitter. Unfortunately, attitude control system bandwidth is usually limited by control system stability concerns and can not be significantly increased. Further, increased bandwidth may also result in increased fuel usage and shortened operating lifetimes.

Another solution is to improve spacecraft structural damping using high damping materials or active damping devices. Unfortunately, this solution tends to significantly increase the cost of the spacecraft.

Still another solution is to use feedforward compensation to enhance the bandwidth limit of a conventional spacecraft control system. This solution is illustrated in U.S. Pat. No. 5,517,418, issued May 14, 1996 to Green et al. and entitled "Spacecraft Disturbance Compensation Using Feedforward Control," and is hereby incorporated by reference herein. This patent illustrates the employment of feedforward spacecraft compensation to account for spacecraft thermal shock. Unfortunately, however, while the solution employed by the Green reference is effective in controlling spacecraft attitude in the presence of low-bandwidth disturbance sources such as thermal shock, it is less effective in reducing the high frequency harmonic jitter such as those that are induced by interaction of spacecraft instrument scanning and the structural vibration modes of the spacecraft. What is needed is a solution that reduces spacecraft jitter from these higher bandwidth sources. The present invention satisfies that need.

SUMMARY OF THE INVENTION

To address the requirements described above, the present invention discloses a method, apparatus, article of manufacture, and a memory structure for reducing jitter induced by interaction of the scanning of on-board spacecraft instruments and spacecraft structural oscillation modes.

The apparatus comprises a spacecraft control processor for producing an actuator command signal, a signal generator, for producing a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and at least one spacecraft control actuator, communicatively coupled to the spacecraft control processor and the signal generator for inducing satellite motion according to the actuator command signal and the cancellation signal.

The method comprises the steps of generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and providing the cancellation signal to a spacecraft control actuator. The apparatus comprises a storage device tangibly embodying the method steps described above.

The present invention uses feedforward disturbance compensation to reduce jitter from interaction between instrument scanning and spacecraft structural vibration. This is accomplished by characterizing the scan disturbance by its harmonics that interact with spacecraft structures. This allows the interaction problem between spacecraft instrument scan and its structural vibration to be completely described by magnitudes and phases of a small number (typically one or two) of harmonics of the scan disturbance.

Predictions of the magnitudes and phases of these disturbance harmonics can be obtained by ground tests of the instrument, or may be determined in-orbit after the satellite has been deployed. Repeated tests can provide accurate prediction of these magnitudes and phases and of their variations with respect to the instrument scan frequency and/or scan pattern.

Using these predictions and/or measurements, the present invention generates a periodic cancellation signal that includes the same harmonics of equal magnitude but opposite phase to cancel the scan disturbance harmonics that interact with the structures.

In one embodiment, the present invention synchronizes the cancellation system using the instrument scan command. This provides an accurate timing for the cancellation system. In another embodiment, the present invention uses the estimates of spacecraft jitter magnitude and zero-crossing to synchronize the cancellation signal when the scan command is not available.

The foregoing provides the spacecraft control system with a jitter reduction capability that is not achievable by conventional spacecraft control methods. A conventional spacecraft control system usually has a limited control bandwidth because of its control time delay and its interaction with spacecraft flexibility. The control system has certain jitter reduction capability within its bandwidth, but can not provide any jitter reduction outside its bandwidth.

The multi-frequency cancellation system is also capable of reducing spacecraft jitter in a much wider frequency range. Its bandwidth equals to half of its system sample rate that is, in most of the cases, more than ten times wider than the bandwidth of a conventional spacecraft control system. With a good prediction of jitter frequencies and phases the cancellation system can achieve much better jitter reduction even within the bandwidth of the conventional control system. The present invention can completely cancel the jitter if disturbance magnitude, jitter frequency and phase are exactly predicted. The cancellation system can also be advantageously used in harmony with a conventional control system to form a highly effective spacecraft jitter control system.

In most cases, implementation of the present invention is simplified because only a few disturbance harmonics (one or two) will interact with spacecraft structures and the generated cancellation signal need only contain one or two sinusoidal signal components.

The magnitudes, phases and frequencies of the instrument scan disturbance can usually be accurately predicted. The magnitudes can be obtained by repeated ground tests of the instrument. The frequencies and phases can be derived from the instrument scan start-time and scan pattern. Even when the scan start-time and scan pattern are not available, estimating the magnitude and zero-crossing of spacecraft attitude jitter is not difficult, and can be accomplished with simple algorithms. With estimated jitter zero-crossing time, the frequency and phase are readily derived. Estimated jitter magnitude can then be used to set the state of the cancellation on/off signal.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
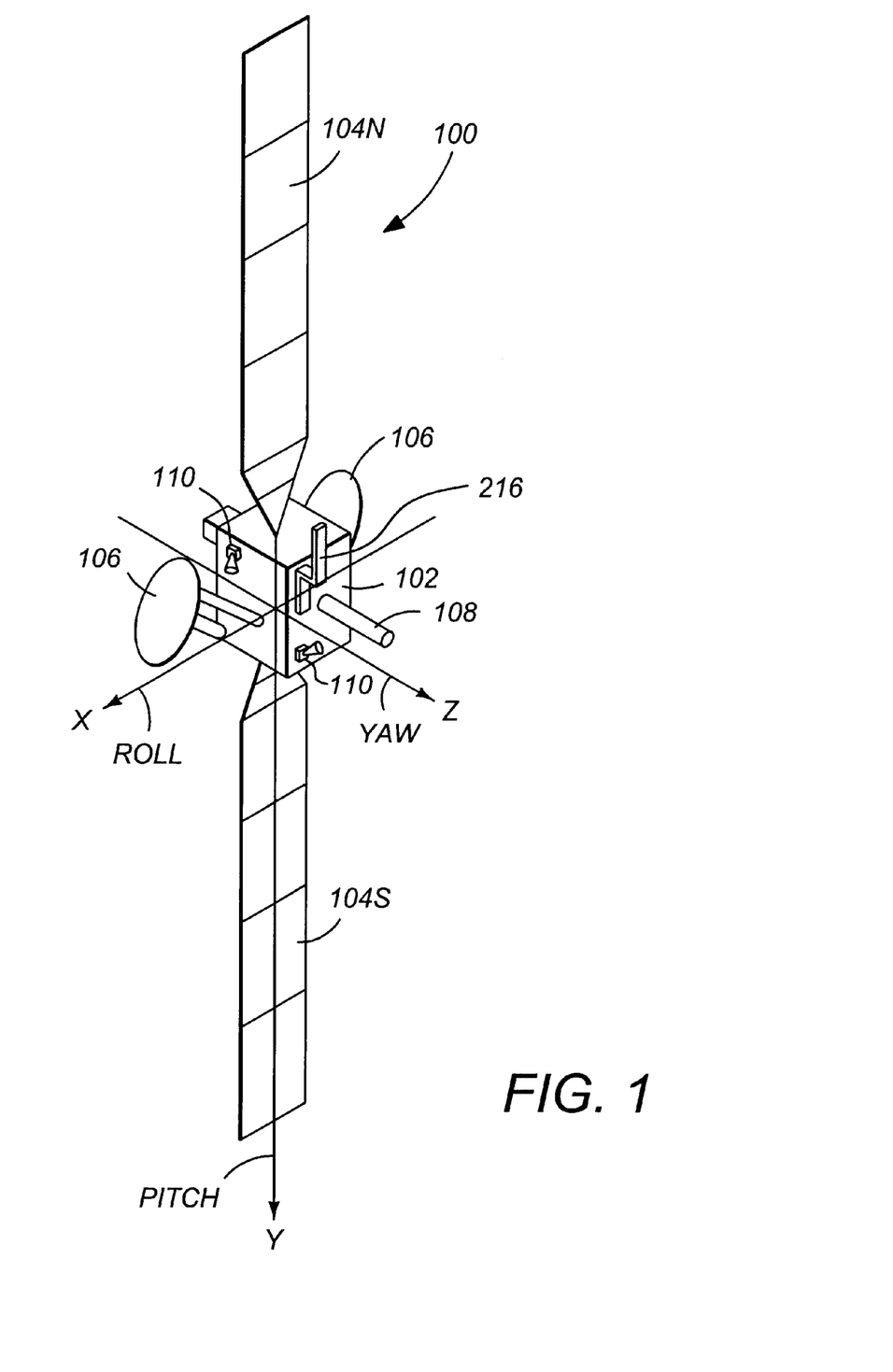
FIG. 1 is a diagram depicting a typical satellite.

FIG. 1 illustrates a three-axis stabilized satellite or spacecraft 100. The spacecraft 100 is preferably situated in a stationary orbit about the Earth. The satellite 100 has a main body 102, a pair of solar panels 104. The satellite 100 may also have a number of instruments and sensors such as one or more high gain narrow beam antennae 106, a telemetry and command omni-directional antenna 108 which is aimed at a control ground station, a boom-mounted magnetometer 216, or an optical imager that is aimed at various ground targets. Each of these instruments and sensors may be physically scanned or may include physically scanning mirrors, thus introducing periodic disturbances to the satellite body 102 and inducing spacecraft jitter.

The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively. As described above, the scan movements of the satellite sensors, instruments, and/or solar panels 104 or the scan movements of the components of the sensors and instruments (such as scanning mirrors) can induce undesirable spacecraft 100 attitude jitter.

The three axes of the spacecraft 100 are shown in FIG. 1. The pitch axis Y lies along the plane of the solar panels 104N and 104S. The roll axis X and yaw axis Z are perpendicular to the pitch axis Y and lie in the directions and planes shown. The antenna 108 points to the Earth along the yaw axis Z.

Figure 2:
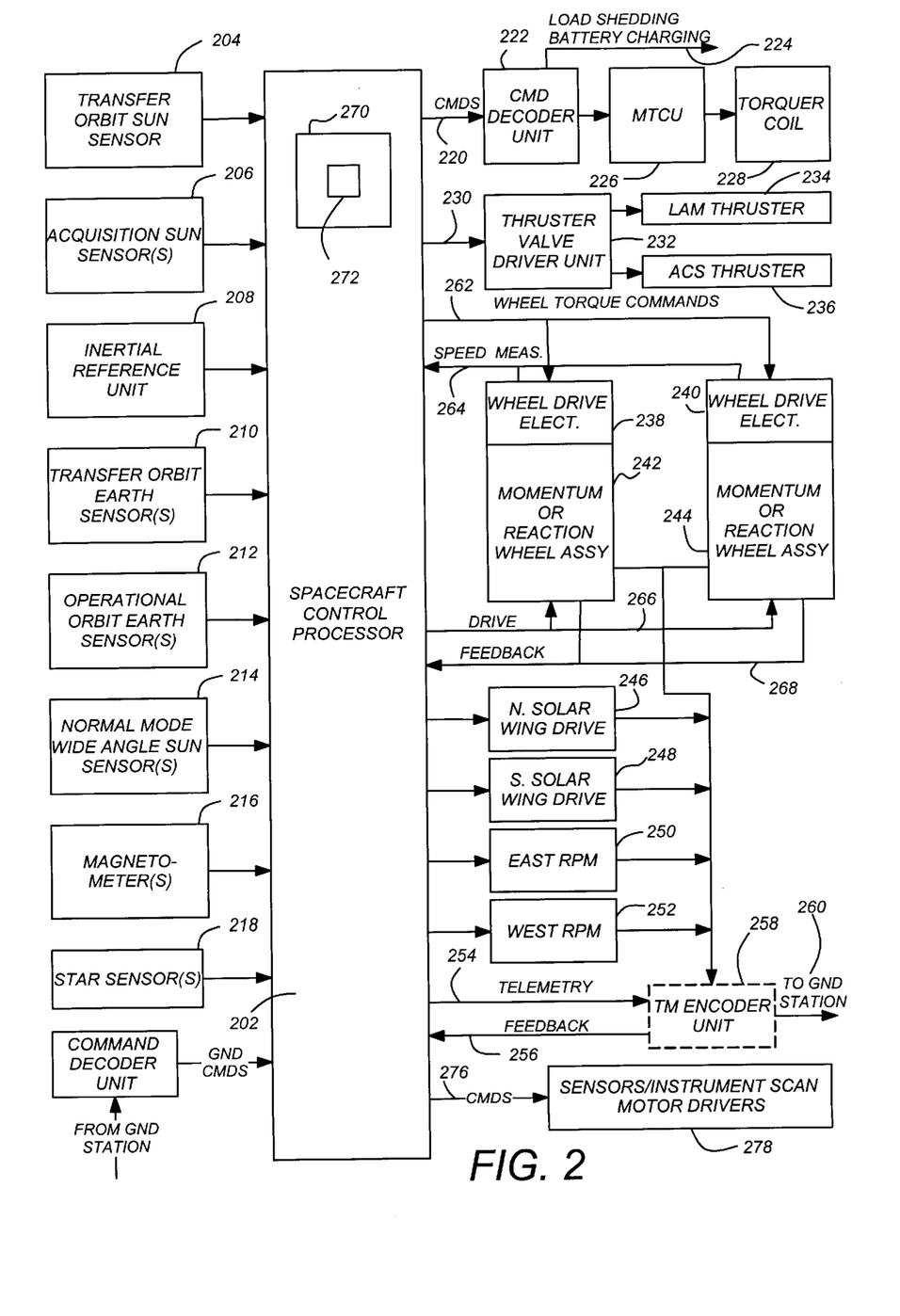
FIG. 2 is a block diagram depicting a satellite control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, station keeping control, normal mode control, mechanisms control, fault protection, and spacecraft systems support, among others. The post ejection sequencing could include initializing to assent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanisms mode control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218. Ground commands are also input into the spacecraft control processor. These commands determine the control functions of the processor and the scan patterns of some instruments and sensors.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Generally, the spacecraft 100 may use thrusters, momentum/reaction wheels, or a combination thereof to perform spacecraft 100 attitude control.

Wheel torque commands 262 are generated by the SCP 202 and are communicated to the wheel speed electronics 238 and 240. These effect changes in the wheel speeds for wheels in momentum/reaction wheel assemblies 242 and 244, respectively. The speed of the wheels is also measured and fed back to the SCP 202 by feedback control signal 264.

When momentum wheel assemblies are used, the spacecraft control processor also sends jackscrew drive signals 266 to the momentum wheel assemblies 242 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

For some satellites, the spacecraft control processor 202 also commands the scan motions of various sensors and instruments. The scan timings and patterns generated by the SCP 202 are communicated to the scan motor drivers 278.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

Analysis of Instrument/Sensor Scan Disturbances

Instrument/sensor scan disturbance is deterministic, periodic and can be well characterized by ground tests of the instrument. Because the disturbance is periodic, it can be expanded into Fourier series as described in equation (1) below:

$$T_{scan} = \sum_{n=0}^{\infty} A_n \sin(2\pi n f_{scan} t + p_n) \quad (1)$$

where $f_{scan}$ is the scan frequency, and $A_n$ and $p_n$ the magnitude and phase of its $n^{th}$ harmonics. To the first order, the spacecraft 100 jitter induced by the scan is also periodic and can be described by a Fourier series. This Fourier series takes the form as described equation (2) below:

$$\Theta_{jitter\_scan} = \sum_{n=0}^{\infty} \|G(j2\pi n f_{scan})\| A_n \sin(2\pi n f_{scan} t + p_n + \angle G(j2\pi n f_{scan})) \quad (2)$$

where G is the spacecraft frequency response function to the scan disturbance. The interaction between the scan disturbance and spacecraft 100 structure occurs when some harmonics of the disturbance coincide with spacecraft 100 structural frequencies. In order to investigate the interaction, the spacecraft jitter is partitioned into the two terms described in equation (3) below.

$$\Theta_{jitter\_scan} = \sum_{nf_{scan}=f_{structures}} \|G(j2\pi n f_{scan})\| A_n \sin(2\pi n f_{scan} t + p_n + \angle G(j2\pi n f_{scan})) + \\ \sum_{nf_{scan} \neq f_{structures}}^{\infty} \|G(j2\pi n f_{scan})\| A_n \sin(2\pi n f_{scan} t + p_n + \angle G(j2\pi n f_{scan})) \quad (3)$$

The first term in equation (3) is due to the disturbance harmonics that interact with spacecraft 100 structures and usually represents a significant contribution to spacecraft 100 jitter. The second term primarily represents the spacecraft 100 rigid body response to the remaining of the disturbance harmonics, and is usually not a significant contributor to spacecraft 100 jitter.

The present invention reduces jitter by generating a cancellation signal of the form described in equation (4) below, $$T_{cancel} = \sum_{nf_{scan}=f_{structures}} A_n \sin(2\pi n f_{scan} t + q_n) + \quad (4)$$

$$\sum_{nf_{scan} \neq f_{structures}}^{N} B_n \sin(2\pi n f_{scan} t + s_n)$$

where the phase $q_n$ differs from phase $p_n$ by 180 degrees, $B_n$ and $s_n$ are arbitrary, and N (the total number of harmonics in the cancellation signal) is equal to or larger than the number of the disturbance harmonics interacting with the structures. Because the phases of the cancellation harmonics for the disturbance frequencies that interact with the structures are opposite to the phases of the disturbance, they completely cancel these disturbance harmonics. The resulting spacecraft 100 jitter can then be described according to equation (5) below.

$$\Theta_{jitter\_scan\_cancel} = \sum_{nf_{scan} \neq f_{structures}}^{N} \|G(j2\pi nf_{scan})\| B_n \sin(2\pi n f_{scan} t + s_n + \angle G(j2\pi nf_{scan})) + \sum_{nf_{scan} \neq f_{structures}}^{\infty} \|G(j2\pi nf_{scan})\| A_n \sin(2\pi n f_{scan} t + p_n + \angle G(j2\pi nf_{scan}))$$

(5)

This residual jitter (after application of the cancellation signal) includes only spacecraft rigid body responses to the rest of disturbance and cancellation torque harmonics, and is usually several orders of magnitude smaller than the jitter induced by the instrument scan and spacecraft 100 structure interaction.

Figure 3:
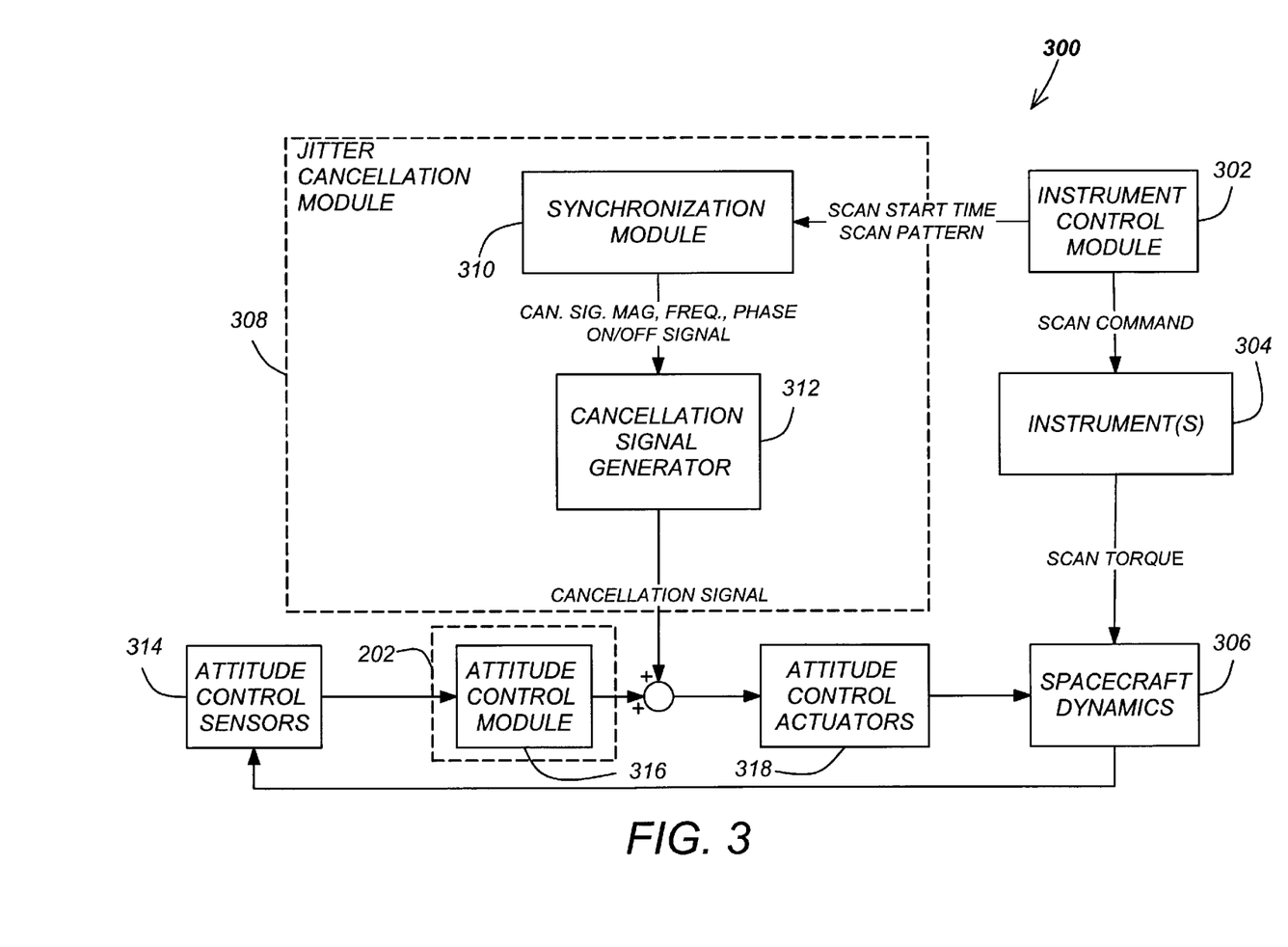
FIG. 3 is a functional block diagram of one embodiment of a spacecraft jitter control system.

FIG. 3 is a functional block diagram of one embodiment of a spacecraft 100 jitter control system 300. The spacecraft jitter control system 300 includes an attitude control sensor suite 314 for measuring the attitude of the spacecraft 100. The attitude control sensor suite 314 includes, for example, the sensors 204–218 described with respect to FIG. 2. An attitude control module 316, which is preferably implemented in the SCP 202 accepts spacecraft attitude measurements from the attitude control sensor suite 314, and generates commands for the attitude control actuator(s) 318. The attitude control actuator(s) 318 can include, singularly or in combination, the momentum/reaction wheels 242 and 244 and related elements, the ACS and or LAM thrusters 236, 234. The attitude control actuator(s) 318 provide a torque or other dynamic input to the spacecraft 100 to effect desired spacecraft 100 motion in accordance with the spacecraft dynamic characteristics 306. Generally, when in use, instrument(s) 304 such as narrow beam antennae 106, the omni-directional antenna 108, the boom-mounted magnetometer 216 or components of instruments such as scan mirrors of an optical imager are physically scanned about, to direct the instrument or its components at one or more locations in space, or locations on the earth's surface. These scan operations are performed in accordance with a scan command issued by the instrument control module 302. Unfortunately, the scanning motions often cause undesirable scan torques which are applied to the spacecraft 100.

To account for these scan torques, the present invention includes a jitter cancellation module 308. In one embodiment, the jitter cancellation module 308 includes a synchronization module 310, which accepts information from the instrument control module 302 including, for example, the start time of the instrument scan and the instrument scan pattern. Using this information, the synchronization module computes cancellation signal parameters such as the magnitude of the cancellation signal, the frequency components of the cancellation signal, the phase of the cancellation signal. These parameters are provided to a cancellation signal generator 312, which generates a cancellation signal in accordance with the parameters provided by the synchronization module 310. The cancellation signal includes signal components with the proper frequency, phase, and magnitude. The cancellation signal is provided to the attitude control actuators 318 to command spacecraft motion 100 that compensates for the scan disturbances from the instrument(s) 304. The synchronization module 310 also provides an on/off signal, which indicates when the cancellation should be initiated or otherwise applied, and when it be removed from the attitude control actuators 318.

Figure 4:
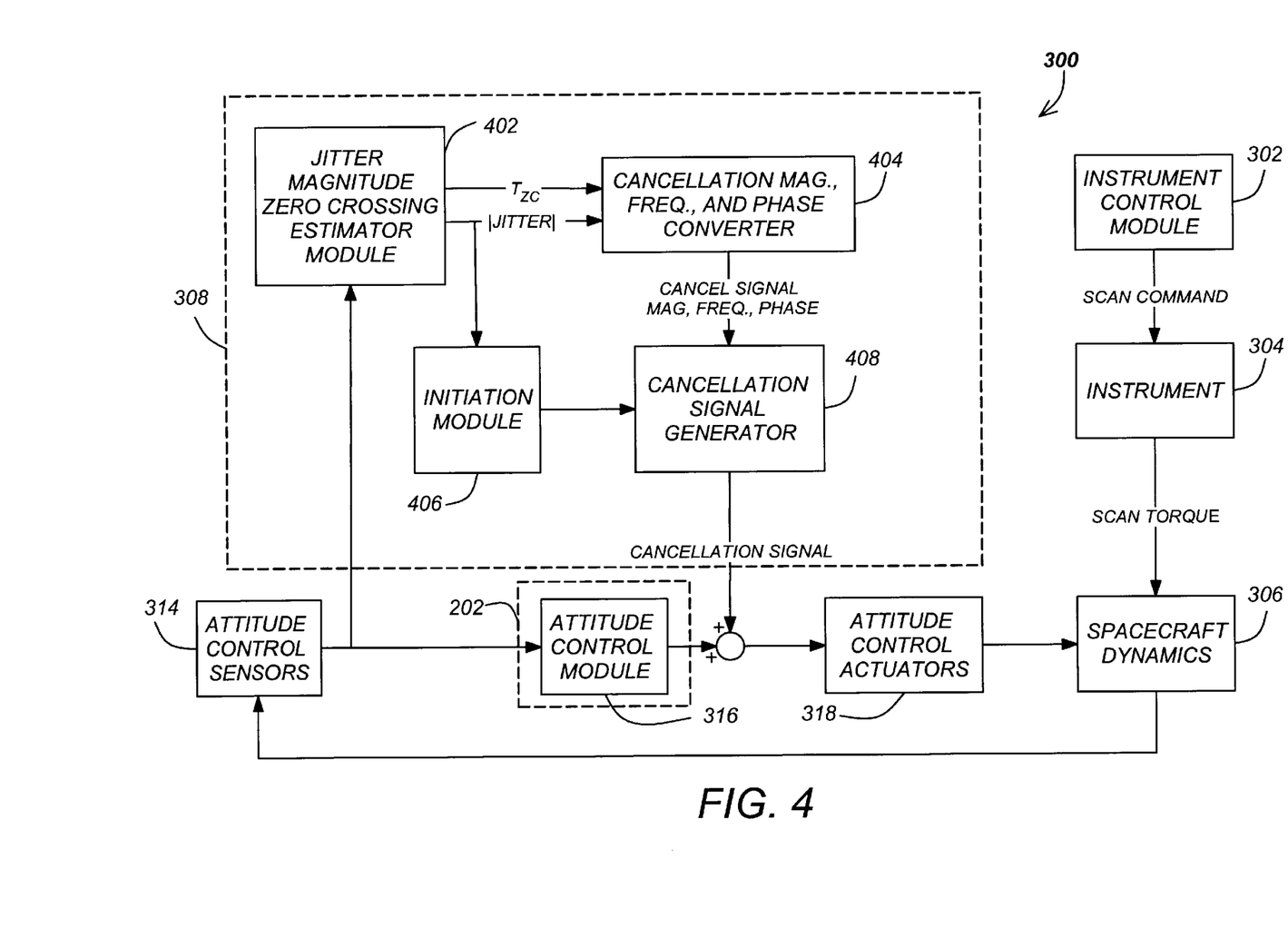
FIG. 4 is a block diagram illustrating another embodiment of the spacecraft jitter control system.

FIG. 4 is a block diagram illustrating another embodiment of the jitter cancellation system 300. In this embodiment, the jitter cancellation system 300 does not require information from the instrument control module 302 (or the instrument 304 for that matter) in order to generate the required information for computation of the cancellation signal.

In this embodiment, the jitter cancellation module 308 includes a jitter magnitude and zero crossing estimator 402, a cancellation magnitude, frequency, and phase converter 404, a cancellation signal on/off module 406, and a cancellation signal generator 408. Using input including that which is obtained or derived from the attitude control sensors 314, the magnitude and zero crossing estimator 402 derives an estimate of the spacecraft 100 jitter magnitude and the time when the jitter crosses zero. The zero crossing time $Z_{TC}$ and jitter magnitude |Jitter| are supplied to the cancellation magnitude, frequency, and phase converter 404, which uses this information to compute the required magnitude, frequency, and phase of the cancellation signal. The cancellation signal generator 408 computes a cancellation signal from this information. The cancellation signal on/off module 406 accepts the estimate of the jitter magnitude, and from this value, determines when the cancellation signal should be applied.

Figure 5:
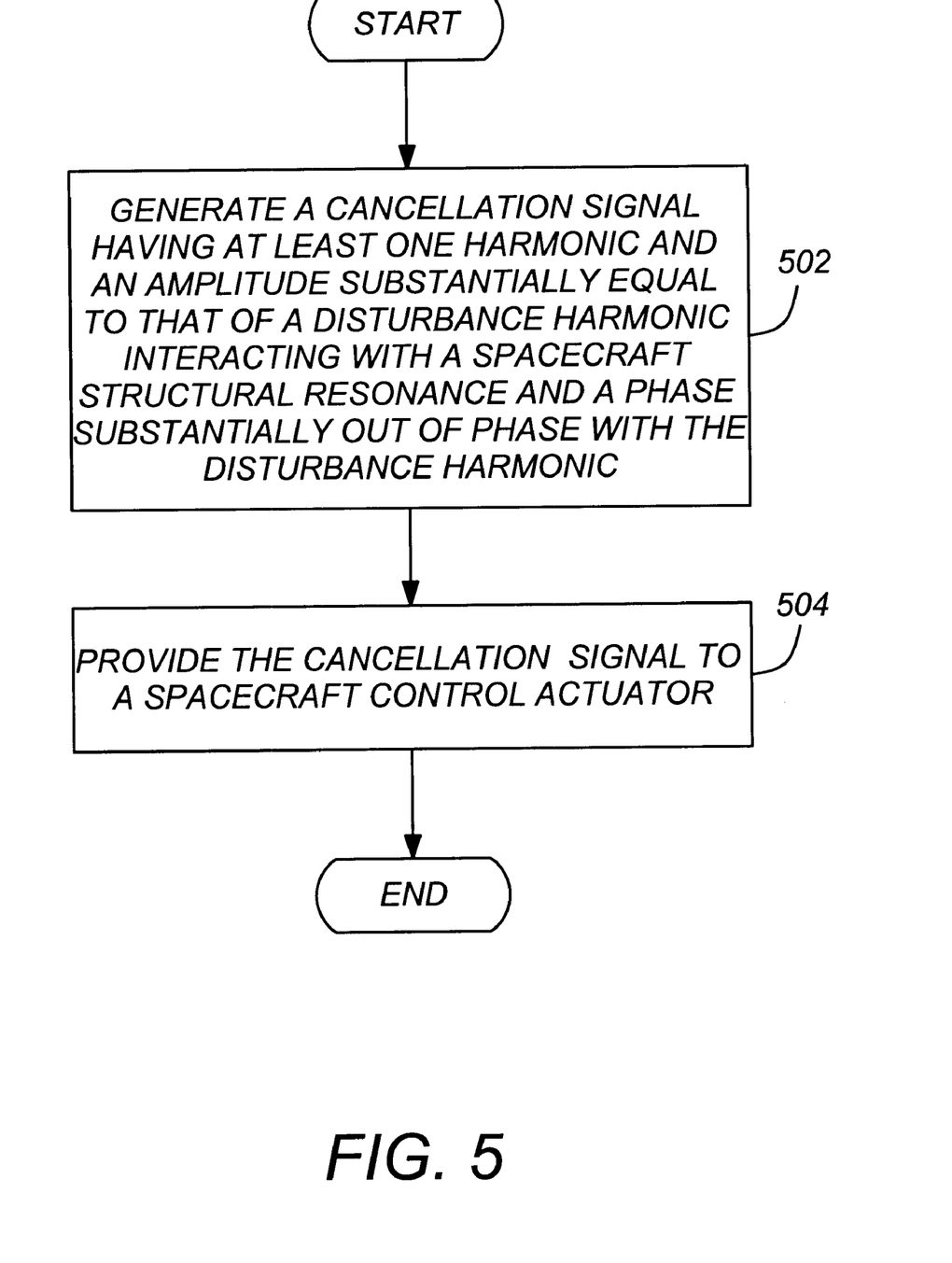
FIG. 5 is a flow chart depicting exemplary process steps used to practice one embodiment of the present invention.

FIG. 5 is a flow chart depicting exemplary process steps used to practice one embodiment of the present invention. A cancellation signal is generated, as shown in block 502. The cancellation signal can be described by one or more harmonics, each having an amplitude and a phase. The amplitude of the harmonic(s) is substantially equal to the amplitude of at least one disturbance harmonic interacting with a spacecraft 100 structural resonance and a phase substantially out of phase with the disturbance harmonic. The cancellation signal is provided to the spacecraft control actuators 318 to effect spacecraft 100 motion to compensate for the instrument-induced jitter, as shown in block 504. In one embodiment, the cancellation signal is generated as a sum of a Fourier series having coefficient magnitudes and phases selected according to the frequency, amplitude, and phase of a disturbance harmonic interacting with a spacecraft 100 structural resonance.

Figure 6:
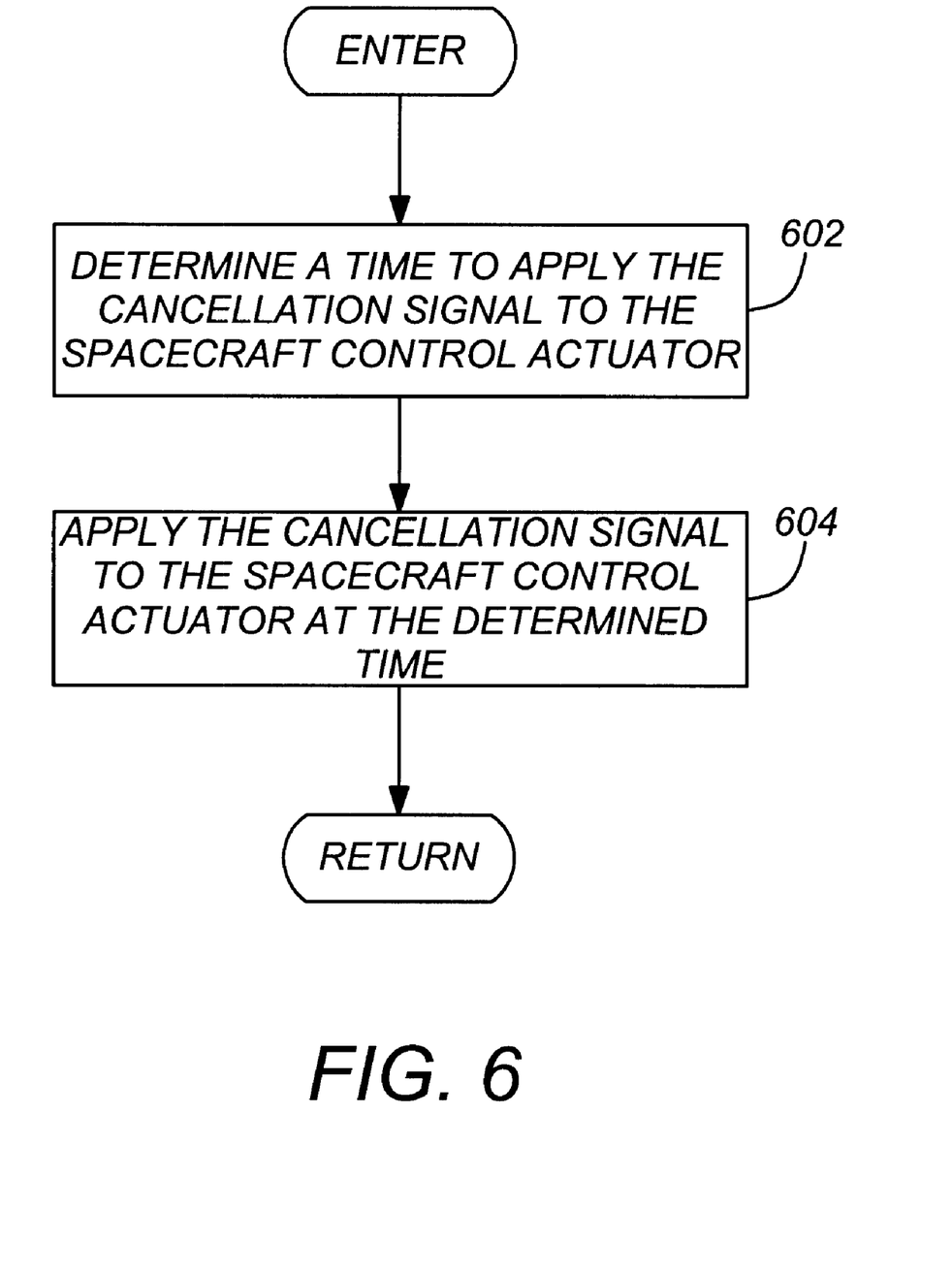
FIG. 6 is a flow chart illustrating exemplary process steps used to provide the cancellation signal to the spacecraft control actuators.

FIG. 6 is a flow chart depicting exemplary process steps used to provide the cancellation signal to the spacecraft control actuators 318. A time to apply the cancellation signal to the spacecraft control actuators is determined, as shown in block 602. The cancellation signal is then applied, as shown in block 604. In one embodiment of the present invention, the cancellation signal is applied when the instrument 304 inducing the jitter is activated, thus inducing the spacecraft 100 jitter.

Figure 7:
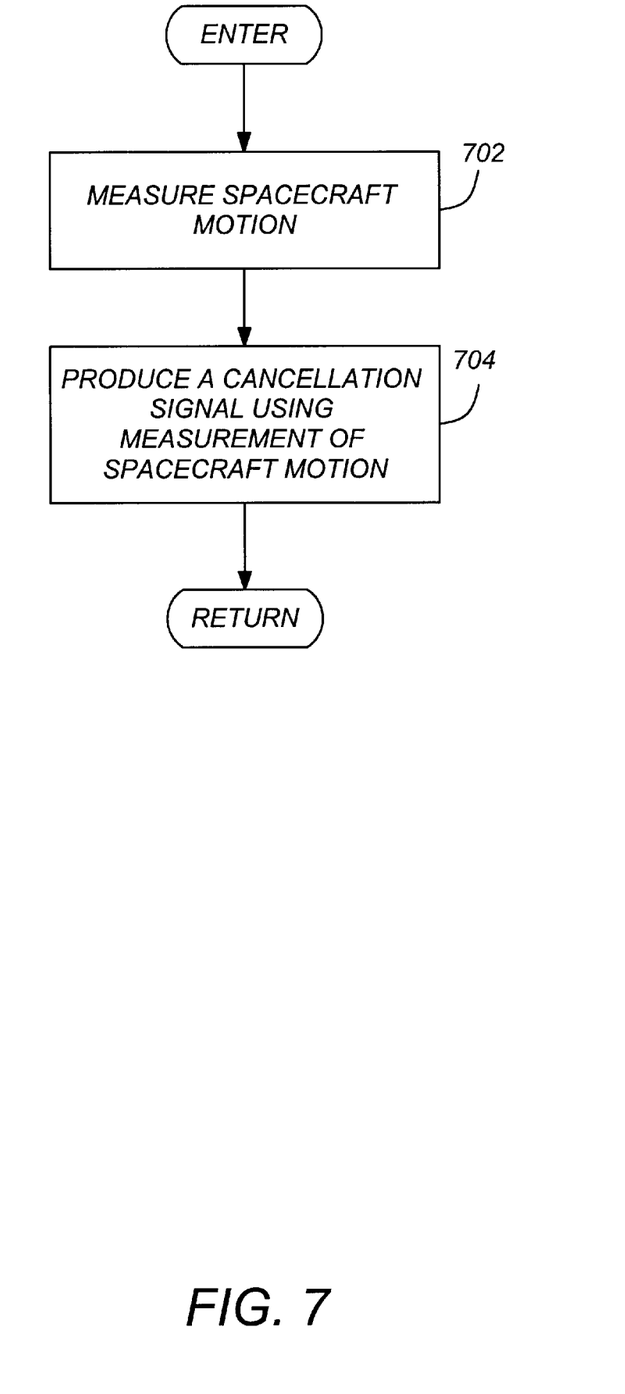
FIG. 7 is a flow chart illustrating exemplary process steps used to determine the cancellation signal.

FIG. 7 is a flow chart depicting exemplary process steps used to determine the cancellation signal. Here, spacecraft 100 motion, such as spacecraft 100 attitude rates are determined, as shown in block 702. These spacecraft motion measurements are then used to produce the cancellation signal, as shown in block 704.

Figure 8:
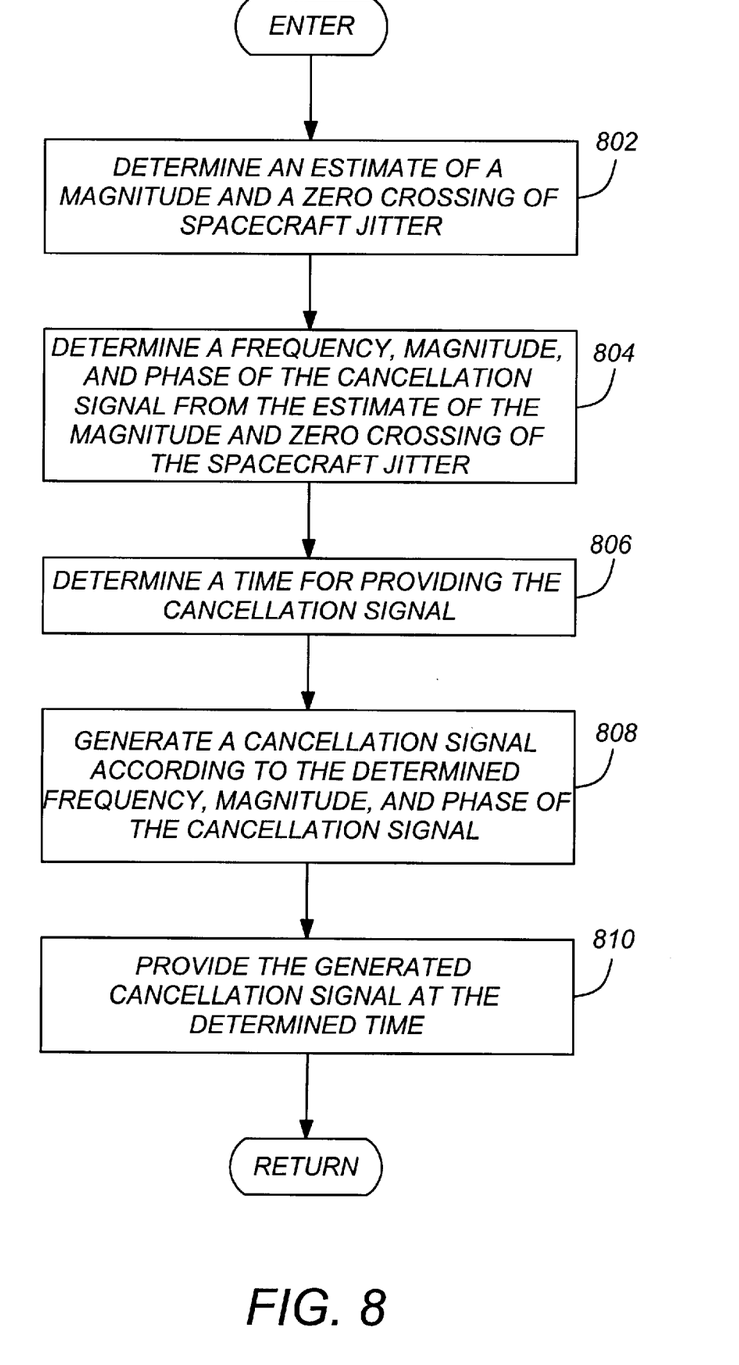
FIG. 8 is a flow chart depicting exemplary process steps used to determine the cancellation signal in another embodiment of the invention.

FIG. 8 is a flow chart depicting exemplary process steps used to determine the cancellation signal in another embodiment of the present invention. An estimate of the magnitude and a zero crossing of spacecraft jitter is determined, as shown in block 802. This information is used to generate a frequency, magnitude, and phase of the cancellation signal, as shown in block 804. A cancellation signal is generated 808 in accordance with the frequency, magnitude, and phase determined in block 804. As shown in block 810, this cancellation signal is provided at a time that is determined in block 806.

Figure 9:
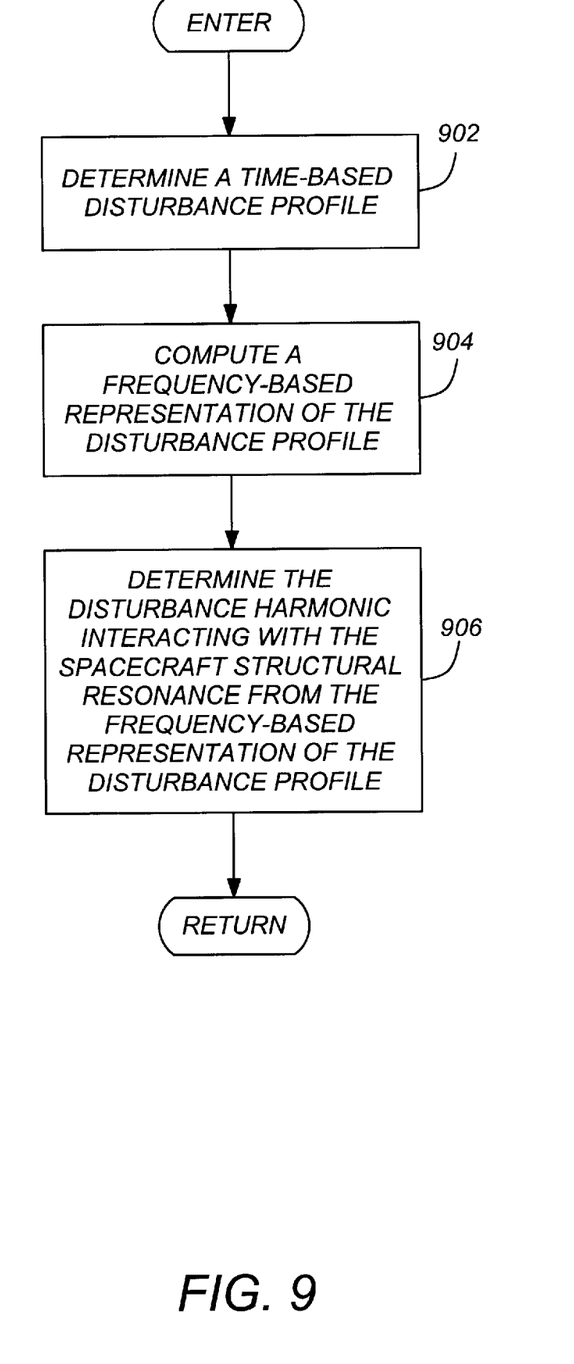
FIG. 9 is a flow chart depicting exemplary process steps used to determine a disturbance harmonic interacting with the spacecraft structural resonances.

FIG. 9 is a flow chart depicting exemplary process steps used to determine a disturbance harmonic interacting with spacecraft 100 structural resonances. First, a time-based disturbance profile is determined, as shown in block 902. In one embodiment, this is accomplished by commanding the instrument 304 to scan, and obtaining a time-domain response of the spacecraft 100 structural response. Alternatively, an instrument scan profile (which can include a series of step commands, impulse commands, commands with smooth profiles) can be input to the instrument 304. The spacecraft response may be determined by use of suitably placed accelerometers, or angular rate measurement instruments. A frequency-based representation of the disturbance profile is then computed using the techniques described above, as shown in blocks 904 and 906. The frequency-based representation of the disturbance profile is then used to determine the spacecraft 100 disturbance harmonics. The disturbance harmonic interacting with spacecraft 100 structural resonances can also be determined by analysis. In simulation, a time-based disturbance profile can be used to excite a spacecraft model. This simulation response of this model will reveal the interaction between the disturbance and the structural resonance. Alternatively, a frequency-based representation of the disturbance can be used to multiply transfer functions of the spacecraft model. The result is a frequency-based representation of spacecraft 100 response(s) to the disturbance.

Exemplary Application of the Jitter Compensation System

In the following discussion, the present invention is applied to reduce the spacecraft jitter induced by interaction between a satellite imager and a magnetometer boom 216. When the spacecraft imager performs a scan of the Eastern United States, its scan frequency is very close to the structural frequency of the satellite's magnetometer boom 216 frequency. If the two frequencies substantially coincide with each other, the spacecraft jitter resulting from their interaction can be ten times higher the permitted amount.

Figure 10A:
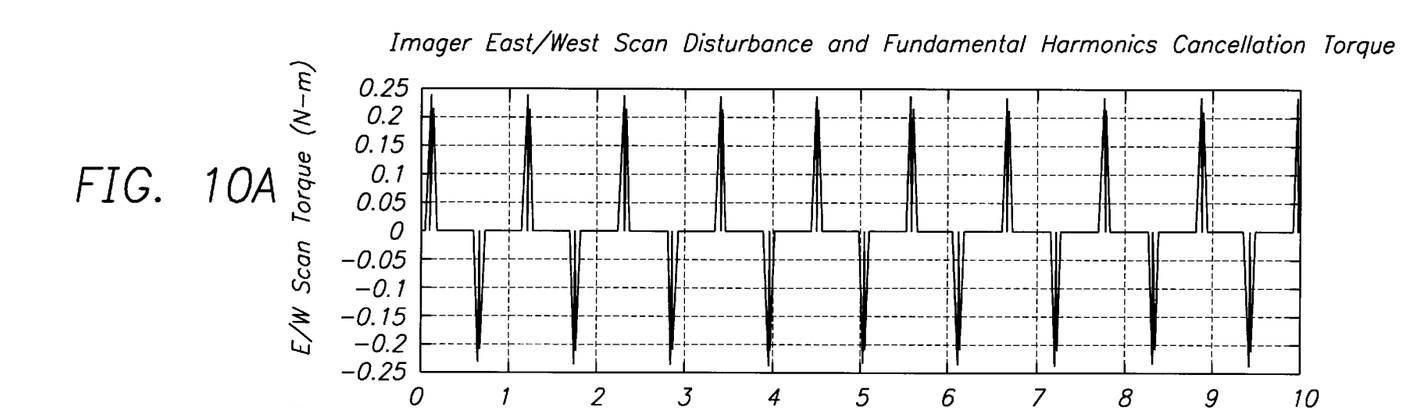
FIG. 10A is a diagram showing the disturbance torque induced by a satellite imager performing a scan.

FIG. 10A is a diagram showing the disturbance torque induced by the satellite imager performing and East/West scan.

Figure 10B:
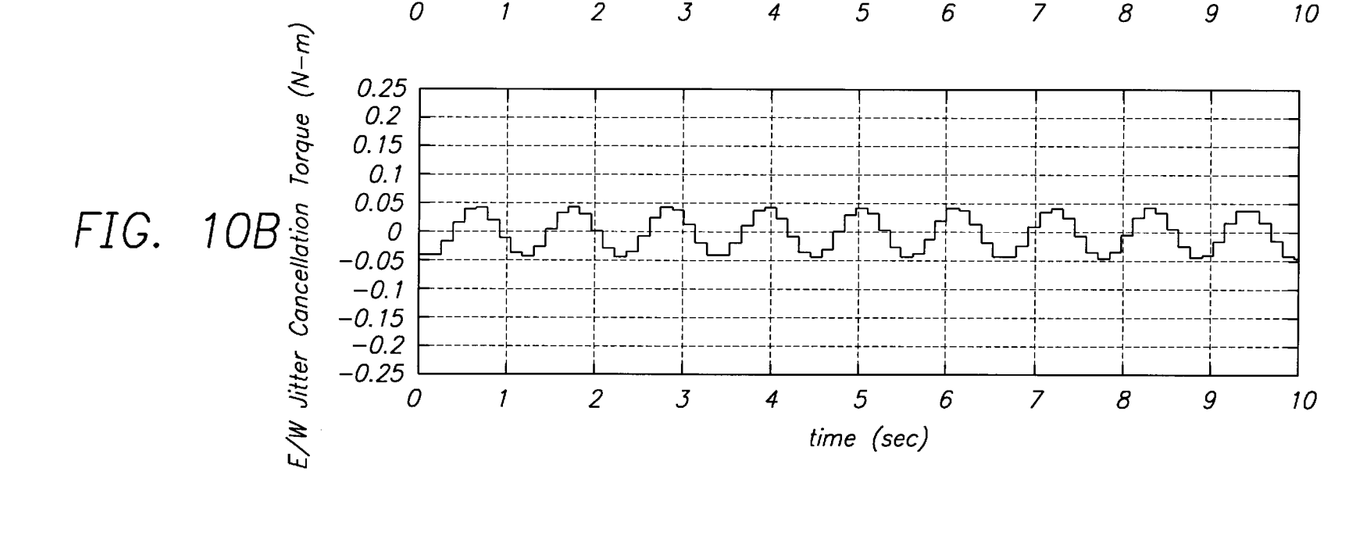
FIG. 10B is a diagram showing a cancellation torque to be applied to reduce the induced jitter.

FIG. 10B is a diagram showing a cancellation torque to be applied to reduce the jitter.

Figure 11A:
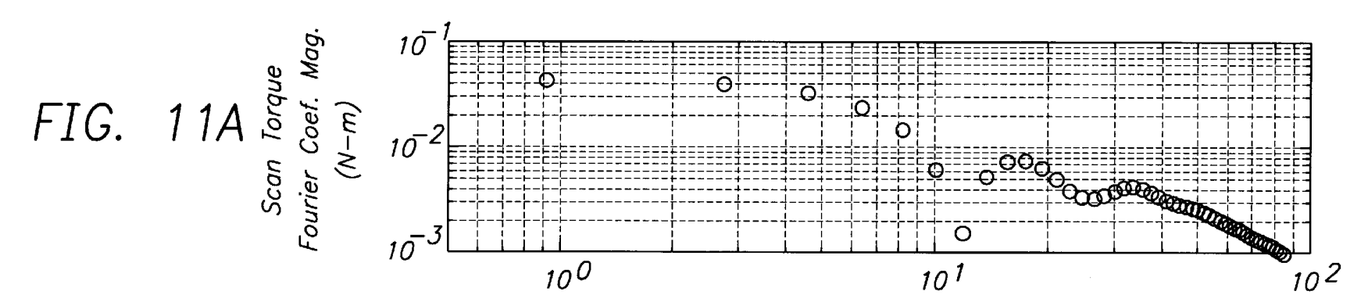
FIG. 11A is a diagram showing the Fourier coefficient magnitudes of the scan torque depicted in FIG. 10A.

FIG. 11A shows the Fourier coefficient magnitudes of the scan torque.

Figure 11B:
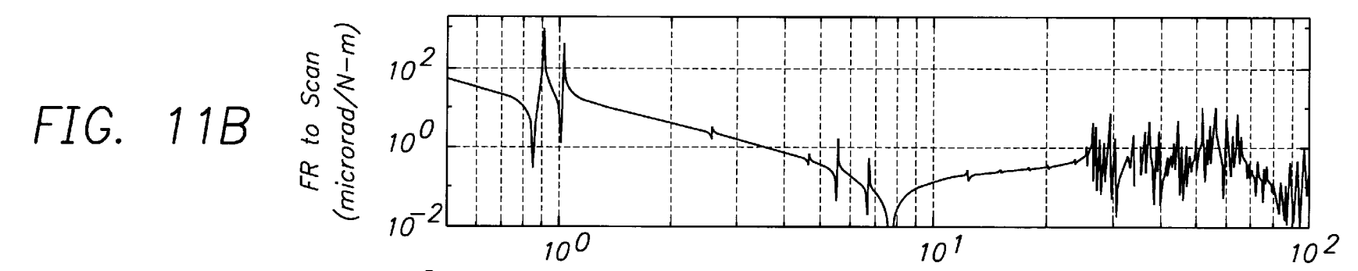
FIG. 11B is a diagram showing a frequency response of the spacecraft dynamics to scan disturbances.

FIG. 11B shows a frequency response of spacecraft dynamics to the scan torque.

Figure 11C:
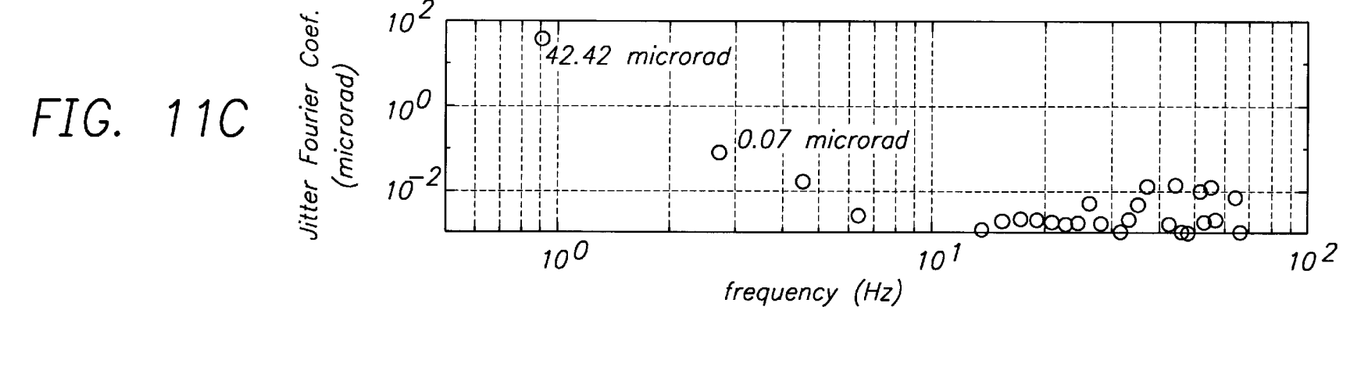
FIG. 11C is a diagram showing the Fourier coefficient magnitudes of the spacecraft jitter due to the scan disturbances.

FIG. 11C shows the Fourier coefficient magnitudes of the spacecraft jitter due to the scan disturbance.

The fundamental harmonics of the scan is at 0.914 Hz that coincides with the fundamental structural frequency of the magnetometer boom 216. The high resonant characteristics of the boom 216 at this frequency causes spacecraft jitter Fourier series shown in FIG. 11C to have a high coefficient magnitude at the 0.914 Hz frequency. The magnitudes of all the other jitter Fourier series coefficients are more than two orders of magnitudes smaller than that of the coefficient at this frequency.

Figure 12A:
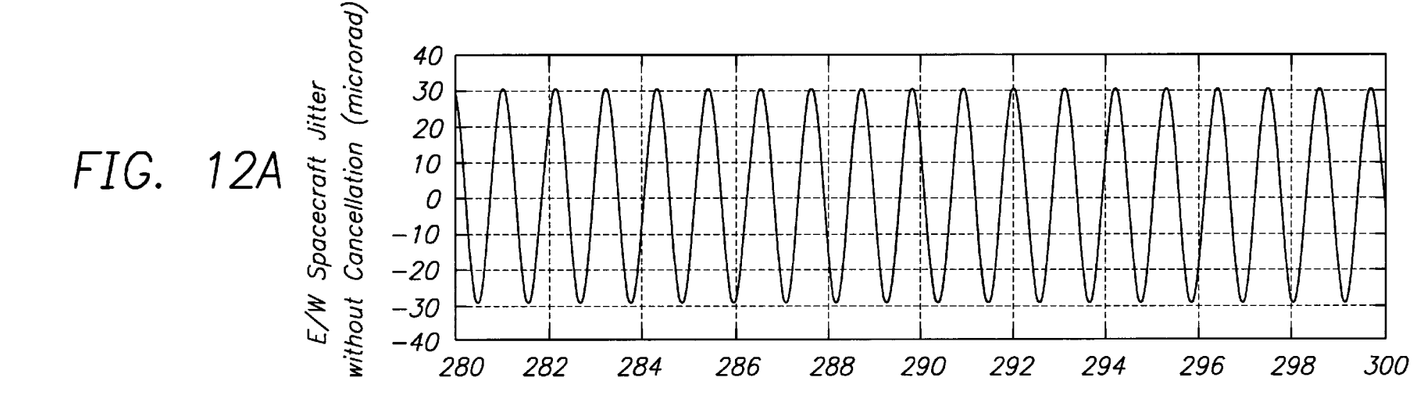
FIGS. 12A and 12B are diagrams showing the spacecraft jitter before, and after applying the jitter compensation of the present invention.

FIG. 12A shows the results of a simulation of uncompensated satellite jitter due to interaction between the imager scan and the magnetometer boom 216. FIG. 12A shows that the attitude of the spacecraft 100 is essentially oscillating at the boom 216 frequency with a magnitude of 30 microradians ($\mu$rad). The predicted magnitude (obtained from the results shown in FIGS. 11A–11C) is 42 $\mu$rad. The difference is attributable to the fact that the true natural frequency of the boom 216 does not exactly coincide with the simulated scan frequency of 0.914 Hz, and to the fact that the simulation used to predict the 0.914 Hz frequency did not reach its steady state.

FIG. 10B also shows is a plot of the generated cancellation torque. Note that the cancellation torque contains only one harmonic at 0.914 Hz. It is noteworthy that the magnitude of this cancellation torque (0.042 Nm) is only one fifth of the disturbance torque magnitude (0.24 Nm), and equal the coefficient magnitude of scan disturbance Fourier series at its fundamental frequency. The phase of the cancellation signal is chosen that it be almost opposite to the phase of the fundamental harmonic with the maximum error. This error is equivalent to the largest start-time uncertainty of imager scan (16.4 milli-seconds). The stair-case shape of the cancellation torque signal is due to the D/A process by which it is sampled at every 131.2 m-seconds and is sent to reaction wheels.

Figure 12B:
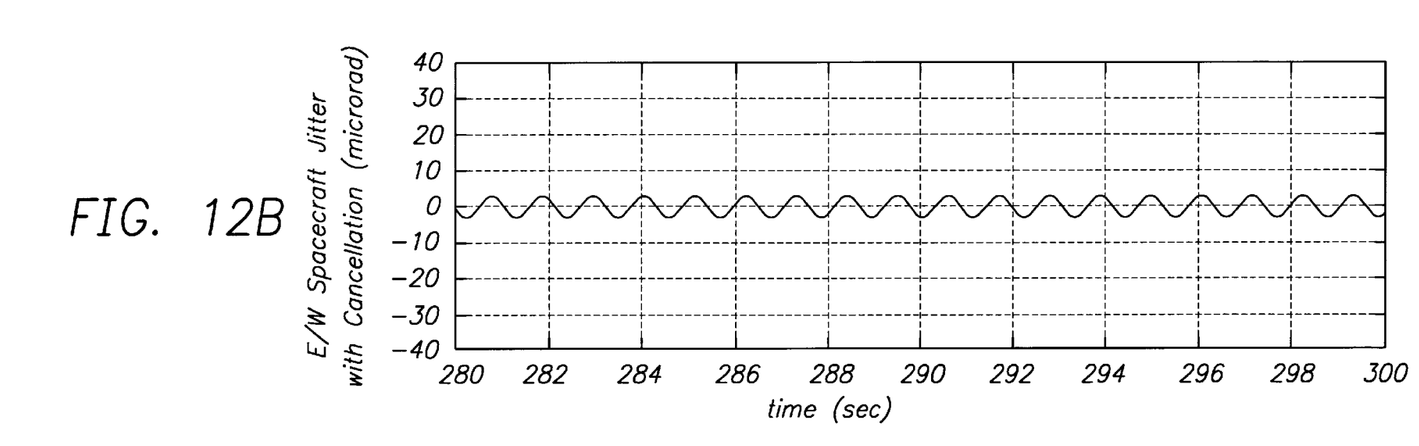

FIG. 12B shows the result of a simulation of the spacecraft 100 jitter from an instrument scan, after the jitter cancellation is applied. The scan torque and the cancellation torque are applied through East/West imager scan gimbals (which are used to scan the instrument) and reaction wheels (which are used to control the attitude of the spacecraft 100). The scan gimbals and reaction wheel actuators are not co-located on spacecraft 100 bus. FIG. 12B shows that after compensation, the spacecraft 100 jitter is less than 3 $\mu$radians. This represents a reduction in jitter by a factor of ten, even though the cancellation torque contains the maximum timing error and includes D/A errors.

Conclusion

This concludes the description of the preferred embodiments of the present invention. In summary, the present invention describes a method, apparatus, and article of manufacture reducing jitter induced by interaction of the scanning of on-board spacecraft instruments and spacecraft structural oscillation modes.

The apparatus comprises a spacecraft control processor for producing an actuator command signal, a signal generator, for producing a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and at least one spacecraft control actuator, communicatively coupled to the spacecraft control processor and the signal generator for inducing satellite motion according to the actuator command signal and the cancellation signal.

The method comprises the steps of generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance, and providing the cancellation signal to a spacecraft control actuator. The apparatus comprises a storage device tangibly embodying the method steps described above.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A control system for reducing spacecraft jitter, comprising:
    a spacecraft control processor, for producing an actuator command signal;
    a signal generator, for producing a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance; and
    at least one spacecraft control actuator, communicatively coupled to the spacecraft control processor and the signal generator for inducing satellite motion according to the actuator command signal and the cancellation signal.

2. The system of claim 1, further comprising a synchronization module for initiating the cancellation signal.

3. The system of claim 2, wherein the synchronization module is communicatively coupled to an instrument inducing the disturbance harmonic.

4. The system of claim 3, wherein the instrument is a scanning instrument, and the scanning instrument communicates information to the synchronization module, the information selected from the group comprising a scan start time and a scan pattern.

5. The system of claim 1, wherein the signal generator produces a cancellation signal according to spacecraft motion data from at least one spacecraft motion sensor.

6. The system of claim 5, further comprising:
    an estimator module, communicatively coupled to at least one spacecraft motion sensor, for determining an estimate of a magnitude and a zero-crossing of the spacecraft jitter; and
    a converter, communicatively coupled to the estimator module and the signal generator, for determining the frequency, the magnitude, and the phase of the cancellation signal.

7. The system of claim 6, further comprising:
    an initiation module for commanding the signal generator to provide the cancellation signal according to the estimate of the magnitude of the spacecraft jitter.

8. The system of claim 1, wherein the signal generator produces a periodic cancellation signal as the sum of a Fourier series having coefficient magnitudes and phases selected according to the frequency, amplitude, and phase of the disturbance harmonic interacting with the spacecraft structural resonance.

9. A method of reducing spacecraft jitter, comprising the steps of:
    generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance; and
    providing the cancellation signal to a spacecraft control actuator.

10. The method of claim 9, wherein the step of providing the cancellation signal to the spacecraft control actuator comprises the steps of:
    determining a time to apply the cancellation signal to the spacecraft control actuator; and
    applying the cancellation signal to the spacecraft control actuator at the time.

11. The method of claim 10, wherein the step of determining a time to apply the cancellation signal comprises the step of applying the signal when an instrument scan inducing the disturbance harmonic is activated.

12. The method of claim 9, wherein the step of generating a cancellation signal comprises the steps of:
    measuring spacecraft motion; and
    producing a cancellation signal using the spacecraft motion measurement.

13. The method of claim 12, wherein the step of producing a cancellation signal using the spacecraft motion measurement comprises the steps of:
    determining an estimate of a magnitude and a zero-crossing of the spacecraft jitter from the measured spacecraft motion;
    determining the frequency, magnitude, and phase of the cancellation signal from the estimate of the magnitude and zero-crossing of the spacecraft jitter;
    determining a time for providing the cancellation signal from the estimate of the magnitude of the spacecraft jitter;
    generating the cancellation signal according to the determined frequency, magnitude, and phase of the cancellation signal; and
    providing the generated cancellation signal at the determined time.

14. The method of claim 9, wherein the step of generating the cancellation signal comprises the step of generating a sum of a Fourier series having coefficient magnitudes and phases selected according to the frequency, amplitude, and phase of the disturbance harmonic interacting with the spacecraft structural resonance.

15. The method of claim 9, further comprising the steps of:
    determining a time-based disturbance profile;
    computing a frequency-based representation of the disturbance profile; and determining the disturbance harmonic interacting with the spacecraft structural resonance from the frequency-based representation of the disturbance profile.

16. An apparatus for reducing spacecraft jitter, comprising:

means for generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance; and means for providing the cancellation signal to a spacecraft control actuator.

17. The apparatus of claim 16, wherein the means for providing the cancellation signal to the spacecraft control actuator comprises:

means for determining a time to apply the cancellation signal to the spacecraft control actuator; and means for applying the cancellation signal to the spacecraft control actuator at the time.

18. The apparatus of claim 17, wherein the means for determining a time to apply the cancellation signal comprises means for applying the signal when an instrument scan inducing the disturbance harmonic is activated.

19. The apparatus of claim 16, wherein the means for generating a cancellation signal comprises:

means for measuring spacecraft motion; and means for producing a cancellation signal using the spacecraft motion measurement.

20. The apparatus of claim 19, wherein the means for producing a cancellation signal using the spacecraft motion measurement comprises:

means for determining an estimate of a magnitude and a zero-crossing of the spacecraft jitter from the measured spacecraft motion;

means for determining the frequency, magnitude, and phase of the cancellation signal from the estimate of the magnitude and zero-crossing of the spacecraft jitter;

means for determining a time for providing the cancellation signal from the estimate of the magnitude of the spacecraft jitter; and means for generating the cancellation signal according to the determined frequency, magnitude, and phase of the cancellation signal at the determined time.

21. The apparatus of claim 16, wherein the means for generating the cancellation signal comprises means for generating a sum of a Fourier series having coefficient magnitudes and phases selected according to the frequency, amplitude, and phase of the disturbance harmonic interacting with the spacecraft structural resonance.

22. The apparatus of claim 16, further comprising:

means for determining a time-based disturbance profile;

means for computing a frequency-based representation of the disturbance profile; and means for determining the disturbance harmonic interacting with the spacecraft structural resonance from the frequency-based representation of the disturbance profile.

23. An article of manufacture embodying logic for computing a plurality of order-based analysis functions for records stored in a table in a computer system, the logic for performing method steps comprising the method steps of:

generating a cancellation signal having at least one harmonic having a frequency and an amplitude substantially equal to that of a disturbance harmonic interacting with a spacecraft structural resonance and a phase substantially out of phase with the disturbance harmonic interacting with the spacecraft structural resonance; and providing the cancellation signal to a spacecraft control actuator.

24. The article of manufacture of claim 23, wherein the step of providing the cancellation signal to the spacecraft control actuator comprises the steps of:

determining a time to apply the cancellation signal to the spacecraft control actuator; and applying the cancellation signal to the spacecraft control actuator at the time.

25. The article of manufacture of claim 24, wherein the step of determining a time to apply the cancellation signal comprises the step of applying the signal when an instrument scan inducing the disturbance harmonic is activated.

26. The article of manufacture of claim 23, wherein the step of generating a cancellation signal comprises the steps of:

measuring spacecraft motion; and producing a cancellation signal using the spacecraft motion measurement.

27. The article of manufacture of claim 26, wherein the step of producing a cancellation signal using the spacecraft motion measurement comprises the steps of:

determining an estimate of a magnitude and a zero-crossing of the spacecraft jitter from the measured spacecraft motion;

determining the frequency, magnitude, and phase of the cancellation signal from the estimate of the magnitude and zero-crossing of the spacecraft jitter;

determining a time for providing the cancellation signal from the estimate of the magnitude of the spacecraft jitter; and generating the cancellation signal according to the determined frequency, magnitude, and phase of the cancellation signal at the determined time.

28. The article of manufacture of claim 23, wherein the step of generating the cancellation signal comprises the step of generating a sum of a Fourier series having coefficient magnitudes and phases selected according to the frequency, amplitude, and phase of the disturbance harmonic interacting with the spacecraft structural resonance.

29. The article of manufacture of claim 23, further comprising the steps of:

determining a time-based disturbance profile;

computing a frequency-based representation of the disturbance profile; and determining the disturbance harmonic interacting with the spacecraft structural resonance from the frequency-based representation of the disturbance profile.

* * * * *